C. W. P. HEYLANDT.
EXPANSION ENGINE FOR PRODUCING LOW TEMPERATURES.
APPLICATION FILED JAN. 29, 1910.
1,019,790.
Patented Mar. 12, 1912.
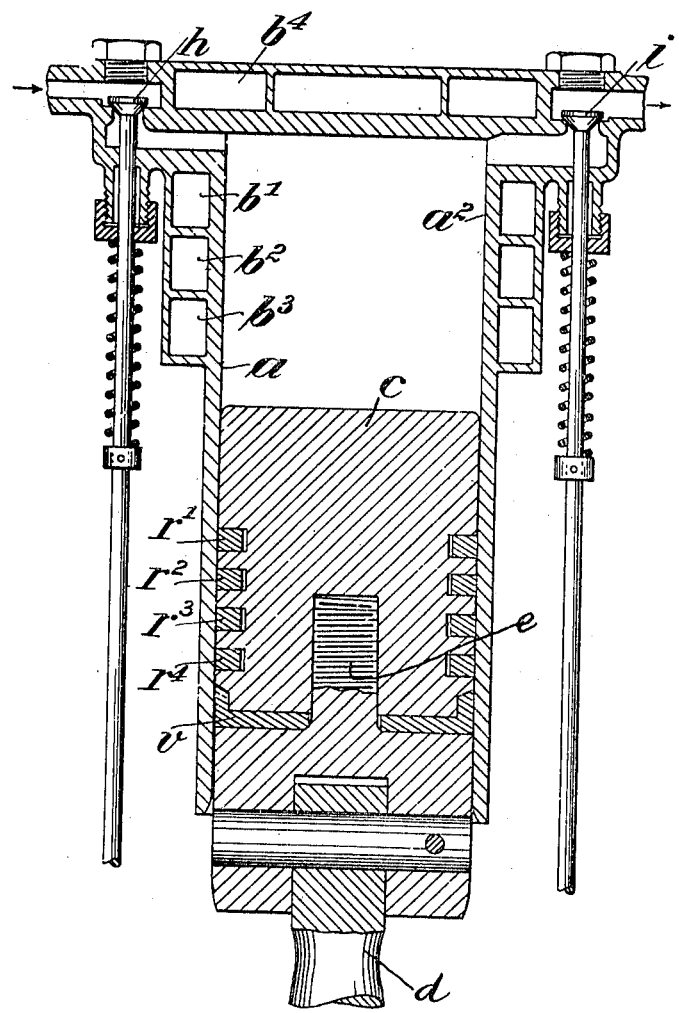

UNITED STATES PATENT OFFICE.

CHRISTIAN WILHELM PAULUS HEYLANDT, OF HAMBURG, GERMANY.

EXPANSION-ENGINE FOR PRODUCING LOW TEMPERATURES.

1,019,790. Specification of Letters Patent. Patented Mar. 12, 1912.

Application filed January 29, 1910. Serial No. 540,900.

*To all whom it may concern:*

Be it known that I, CHRISTIAN WILHELM PAULUS HEYLANDT, a subject of the German Empire, residing at Hamburg, Germany, have invented certain new and useful Improvements in Expansion-Engines for Producing Low Temperatures, of which the following is a specification.

My invention relates to expansion engines in which highly compressed gases are admitted to the cylinder and after closing the inlet valve the gas is allowed to expand while performing work on the piston in the well understood manner so that the gas cools down to a very low temperature. In order to enable the expansion engine to work satisfactorily with gas which is therein expanded and cooled down to an exceedingly low temperature, for example far below one hundred degrees below zero centigrade, without parts of the engine freezing in and without having difficulty with the lubrication of the piston, I construct the expansion engine in a special manner according to this invention.

The drawing represents a vertical cross-section of the device.

I shall proceed to explain the device more in detail by referring to the attached drawing in which $a$ represents an expansion cylinder and $c$ the piston which operates in the same.

In view of the high pressures to be used, a double piston packing has been provided, consisting of the packing rings $r'$, $r^2$, $r^3$ and $r^4$ and the sleeve $v$. The upper part of the cylinder is provided with three superimposed annular vacuum chambers, $b'$, $b^2$ and $b^3$ and with a fourth chamber, $b^4$, covering the upper end of the expansion cylinder and divided by suitable partitions, in order to insure complete insulation from the outside heat, and preventing the efficiency of the chambers, as insulated, from being impaired by the leakage in any one of them.

The admission valve for the compressed gas is represented by $h$, while $i$ is the discharge valve for the expanded and cooled gas. The cylinder $a$ must be made of a metal which is a poor heat conductor, and its walls should be made as thin as possible.

The vacuum chambers $b^1$, $b^2$ and $b^3$ and $b^4$ have been provided on the upper part of the cylinder for the purpose of obtaining an excellent insulation from outside heat, inasmuch as that part of the cylinder must be kept cold. The rings $r^1$, $r^2$, $r^3$ and $r^4$ serve the purpose of preventing the cold from being communicated to the lower part of the cylinder and to the piston. These rings, which like the well-known piston packing rings, are forced by strong spring pressure against the walls of the cylinders, become heated by friction while sliding over the surface of the cylinder walls, the heat thus produced being communicated to the piston and to the walls of the cylinder. The said parts are thus prevented from becoming excessively cold, and the lubricants will retain the consistency required for lubrication. The sleeve $v$ provides an absolutely air-tight packing for the piston. Now, when compressed gas is admitted to the cylinder $a$ through the valve $h$, while the piston is at the upper end of the cylinder, and when on closing the valve $h$ the piston causes the gas to expand while on its downward stroke, the resulting slight cooling effect on the cylinder walls will be principally confined to the upper part of the cylinder, while its lower part will not cool in consequence of the strong friction of the rings, which are under spring pressure. For attaining the purpose of this invention it will be found very useful to give the piston only a very short stroke in comparison with the diameter of the cylinder. The diameter of the upper part $a^2$ of the cylinder is made slightly larger than the diameter of the piston, to prevent friction in these parts.

It will be seen that by this improvement any obstruction by freezing of the mechanical parts is obviated by the motion of the piston itself even when producing the lowest temperatures, inasmuch as the piston generates frictional heat which, while preventing any excessive cooling of the packing, can only be communicated to a very slight extent to the gas which has been cooled down to a very low temperature in the cylinder. The part of the cylinder which does not come in contact with the piston packing is surrounded by heat-insulating means, namely, the vacuum chamber.

I claim the following:

1. In an expansion engine of the class described, the combination with a cylinder having thin walls, of a piston, elastic rings in said piston adapted to so strongly press against the walls of said cylinder as to become heated by friction, whereby said piston is prevented from freezing-in, and a sleeve packing whereby any leaks in the piston are prevented.

2. In an expansion engine of the class described, the combination with a cylinder having thin walls, of a head for one end of said cylinder, an inlet valve, an outlet valve, a piston mounted in said cylinder to reciprocate, elastic rings in said piston adapted to so strongly press against the walls of said cylinder as to become heated by friction, whereby said piston is prevented from freezing-in, a sleeve packing covering one end of said piston, and a vacuum vessel surrounding a part of said cylinder adjacent to said end and adapted to serve as an insulation from outside heat.

3. In an expansion engine of the class described, the combination with a cylinder having thin walls, of a head for one end of said cylinder and an inlet valve and an outlet valve, a piston mounted in said cylinder to reciprocate, elastic rings in said piston adapted to so strongly press against the walls of said cylinder as to become heated by friction, whereby said piston is prevented from freezing-in, a sleeve packing on said piston, and a vacuum vessel surrounding a part of said cylinder adjacent to said end and adapted to serve as an insulation from outside heat, said vacuum vessel being divided by partitions into several air-tight compartments.

4. An expansion engine of the class described, comprising in combination a cylinder having thin side walls, a cylinder head and inlet and exhaust valves for one end of the cylinder, a piston, and means for heating the piston and cylinder walls at points removed from said end to maintain heat in the lubricant of the piston, comprising elastic packing rings surrounding the said piston at points remote from the end of said piston which is toward said cylinder head and acting outward frictionally to generate heat only at points remote from said end, whereby heat is generated locally and is not materially conducted by the said thin walls to the protected end of the cylinder.

In testimony whereof I have signed this specification in the presence of two subscribing witnesses.

CHRISTIAN WILHELM PAULUS HEYLANDT.

Witnesses:
  HENRY HASPER,
  WOLDEMAR HAUPT.